(12) United States Patent
Wassel et al.

(10) Patent No.: US 7,793,268 B2
(45) Date of Patent: Sep. 7, 2010

(54) METHOD, SYSTEM, AND PROGRAM PRODUCT FOR COMPOSING A VIRTUALIZED COMPUTING ENVIRONMENT

(75) Inventors: Peter S. Wassel, Apex, NC (US); Joseph M. Gdaniec, Cary, NC (US); John L. Harter, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/467,617

(22) Filed: Aug. 28, 2006

(65) Prior Publication Data

US 2008/0052707 A1   Feb. 28, 2008

(51) Int. Cl.
G06F 9/44 (2006.01)
G06F 9/445 (2006.01)

(52) U.S. Cl. ............... 717/130; 717/139; 717/155
(58) Field of Classification Search ......... 717/127–134, 717/139–143, 155–159
See application file for complete search history.

(56) References Cited

U.S. PATENT DOCUMENTS

| | | | | |
|---|---|---|---|---|
| 5,339,238 A | * | 8/1994 | Benson ................... | 717/159 |
| 5,524,244 A | * | 6/1996 | Robinson et al. .......... | 717/140 |
| 5,778,212 A | * | 7/1998 | Dehnert et al. ............ | 717/155 |
| 5,842,017 A | * | 11/1998 | Hookway et al. .......... | 717/158 |
| 5,974,256 A | * | 10/1999 | Matthews et al. .......... | 717/141 |
| 6,026,237 A | * | 2/2000 | Berry et al. ............... | 717/130 |
| 6,134,707 A | * | 10/2000 | Herrmann et al. ......... | 717/139 |
| 6,233,729 B1 | * | 5/2001 | Campara et al. ........... | 717/131 |
| 6,279,151 B1 | * | 8/2001 | Breslau et al. ............. | 717/140 |
| 6,408,432 B1 | * | 6/2002 | Herrmann et al. ......... | 717/139 |
| 6,662,359 B1 | * | 12/2003 | Berry et al. ............... | 717/130 |
| 6,986,132 B1 | * | 1/2006 | Schwabe .................. | 717/168 |
| 6,993,751 B2 | * | 1/2006 | Bhansali et al. ........... | 717/137 |
| 7,152,229 B2 | * | 12/2006 | Chong et al. .............. | 717/146 |
| 7,155,708 B2 | * | 12/2006 | Hammes et al. ........... | 717/155 |

(Continued)

FOREIGN PATENT DOCUMENTS

EP   1605380 A1   12/2005

OTHER PUBLICATIONS

Jern, "Information visulization on the web", IEEE, pp. 1-7, 1997.*
Kaur et al, "A layered structure for uniform version management in component based systems", ACM SIGSOFT, vol. 34, No. 6, pp. 1-7, 2009.*

(Continued)

*Primary Examiner*—Anil Khatri
(74) *Attorney, Agent, or Firm*—B. Delano Jordan

(57) ABSTRACT

The present invention provides a method, system, and program product for composing a virtualized computing environment. Specifically, under the present invention, data and a definition file that contains application runtime requirements for the data are stored on a portable memory device. Application runtime requirements can be anything related to an environment in which the data was previously used. When the portable memory device is received in a computerized device, an auto-insert script can be executed that signals a provisioning system and/or transports the definition file to the provisioning system. The provisioning system will then interpret the definition file on the computerized device to retrieve the application runtime requirements. Then, the virtualized computing environment will be composed by adapting an environment of the computerized device according to the application runtime requirements retrieved from the definition file.

16 Claims, 2 Drawing Sheets

U.S. PATENT DOCUMENTS

| | | | |
|---|---|---|---|
| 7,185,329 B1 * | 2/2007 | Verbitsky | 717/156 |
| 7,231,635 B2 * | 6/2007 | Schwabe | 717/126 |
| 7,444,624 B2 * | 10/2008 | Tarkkala | 717/139 |
| 7,467,078 B2 * | 12/2008 | Smith | 703/25 |
| 7,475,388 B2 * | 1/2009 | Fong et al. | 717/130 |
| 7,614,044 B2 * | 11/2009 | Bhansali et al. | 717/145 |
| 2004/0139309 A1 | 7/2004 | Gentil et al. | |
| 2005/0160251 A1 | 7/2005 | Zur et al. | |

OTHER PUBLICATIONS

Bouillet et al, "A tag based approach for the design and composition of information processing applications", ACM OOPSLA, pp. 585-602, 2008.*

Yoder et al, "Architecture and design adaptive object models", ACM SIGPLAN, vol. 36, No. 12, pp. 50-60, 2001.*

* cited by examiner

METHOD, SYSTEM, AND PROGRAM PRODUCT FOR COMPOSING A VIRTUALIZED COMPUTING ENVIRONMENT

BACKGROUND OF THE INVENTION

1. Field of the Invention

The present invention generally relates to computing environments. Specifically, the present invention relates to a method, system, and program product for composing a virtualized computing environment.

2. Related Art

Portable memory devices such as memory keys are becoming increasingly popular. Their most immediate usage has been for quick and easy short-term backup or to provide a non-networked means for transporting data. With such portability come various issues. For example, a re-definition of computing models becomes possible when such immediate access to one's personal data is literally at-hand. As the data is now more highly transportable, a problem arises when personal computing environments that support the data stored on the portable storage device are not readily available (or at least not without significant configuration efforts on the part of the data's owner/user). Moreover, the desire to maintain the applications (that run in the personal computing environment) will become disproportionate with the ease at which one can simply maintain their personal data instead.

In view of the foregoing, there exists a need for a solution that solves at least one of the deficiencies of the related art.

SUMMARY OF THE INVENTION

In general, the present invention provides a method, system, and program product for composing a virtualized computing environment. Specifically, under the present invention, data and a definition file that contains application runtime requirements for the data are stored on a portable memory device (e.g., diskette, CD-ROM, DVD, memory key, etc.). Application runtime requirements can be anything related to an environment in which the data was previously used. Examples include a specific software program/application (e.g., Lotus Notes) that will be needed to access and/or process the data; a version of software applications, preferences (e.g., font size) for using, configuring and/or personalizing the data with the software application, etc. When the portable memory device is received in a computerized device, an auto-insert script can be executed (similar to the "autorun.inf" script that is executed when a CD-ROM is inserted) that signals a provisioning system and/or transports the definition file to the provisioning system. The provisioning system will then interpret the definition file on the computerized device to retrieve the application runtime requirements. Then, the virtualized computing environment will be composed by adapting an environment of the computerized device according to the application runtime requirements retrieved from the definition file.

A first aspect of the present invention provides a method for composing a virtualized computing environment. The method may include receiving a portable memory device on a computerized device, wherein the portable memory device contains data and a definition file that describes application runtime requirements of the data. The method may also include, interpreting the definition file on the computerized device to retrieve the application runtime requirements, and composing the virtualized computing environment by adapting an environment of the computerized device according to the application runtime requirements retrieved from the definition file.

A second aspect of the present invention provides a system for composing a virtualized computing environment. The system may include a system for interpreting a definition file stored on a portable memory device to retrieve application runtime requirements of data associated with the definition file on the portable memory device, and a system for composing the virtualized computing environment by adapting an environment of the computerized device according to the application runtime requirements retrieved from the definition file.

A third aspect of the present invention provides a program product stored on a computer readable medium for composing a virtualized computing environment. The computer readable medium may include program code for causing a computerized device to receive a portable memory device on the computerized device, wherein the portable memory device contains data and a definition file that describes application runtime requirements of the data. The program code may also cause a computerized device to interpret the definition file on the computerized device to retrieve the application runtime requirements, and compose the virtualized computing environment by adapting an environment of the computerized device according to the application runtime requirements retrieved from the definition file.

A fourth aspect of the present invention provides a method for deploying an application for composing a virtualized computing environment. The method may include providing a computer infrastructure being operable to receive a portable memory device on a computerized device, wherein the portable memory device contains data and a definition file that describes application runtime requirements of the data. The computer infrastructure may also be operable to interpret the definition file on the computerized device to retrieve the application runtime requirements, and compose the virtualized computing environment by adapting an environment of the computerized device according to the application runtime requirements retrieved from the definition file.

Therefore, the present invention provides a method, system, and program product for composing a virtualized computing environment.

BRIEF DESCRIPTION OF THE DRAWINGS

These and other features of this invention will be more readily understood from the following detailed description of the various aspects of the invention taken in conjunction with the accompanying drawings in which.

Figure 1:
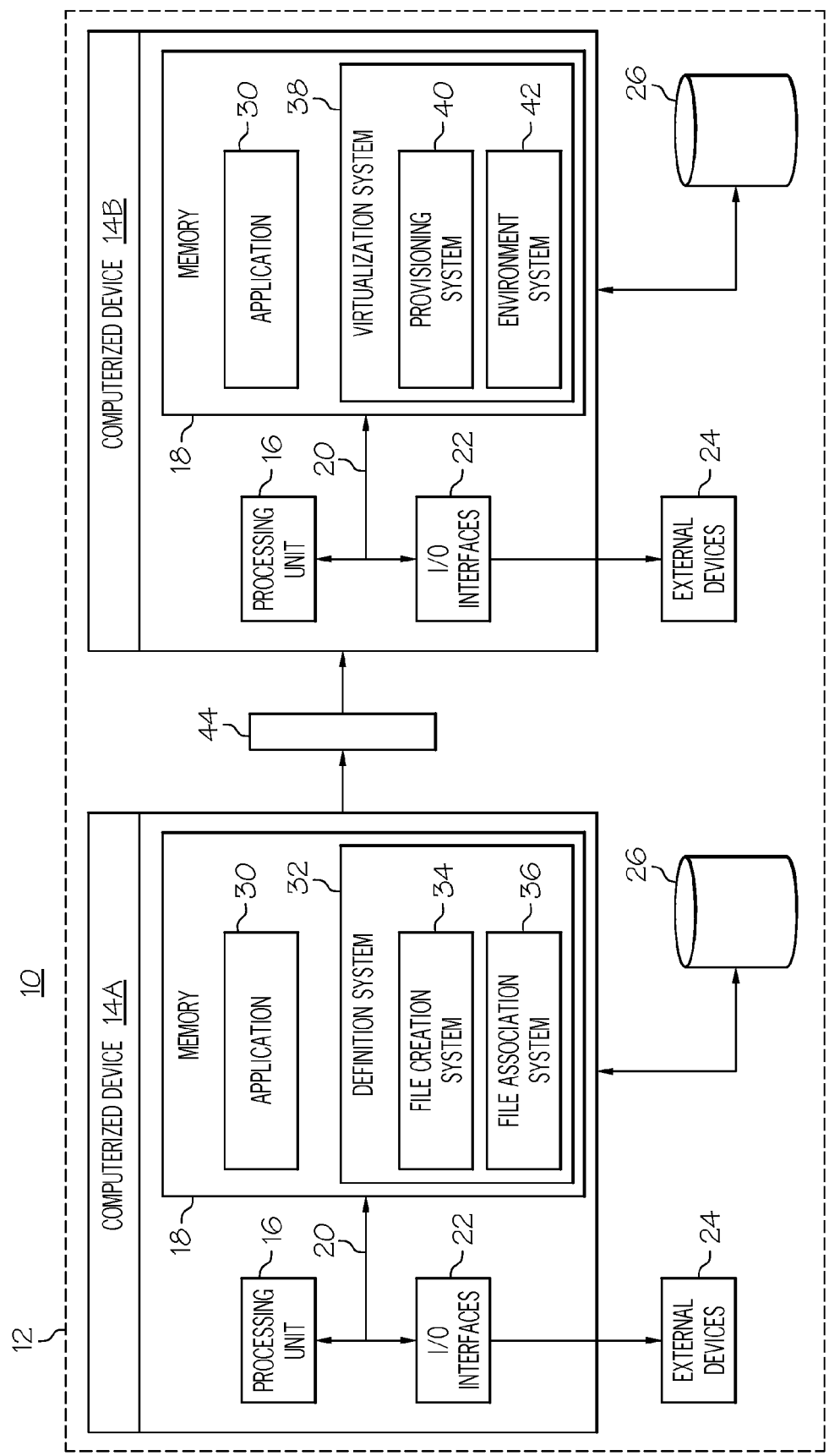
FIG. 1 depicts a system for composing a virtualized computing environment according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and program product for composing a virtualized computing environment. Specifically, under the present invention, data and a definition file that contains application runtime requirements for the data are stored on a portable memory device (e.g., diskette, CD-ROM, DVD, memory key, etc.). Application runtime requirements can be anything related to an environment in which the data was previously used. Examples include a specific software program/application (e.g., Lotus Notes) that will be needed to access and/or process the data, a version of software applications, preferences (e.g., font size) for using, configuring and/or personalizing the data with the software application, etc. When the portable memory device is received in a computerized device, an auto-insert script can be executed (similar to the "autorun.inf" script that is executed when a CD-ROM is inserted) that signals a provisioning system and/or transports the definition file to the provisioning system. The provisioning system will then interpret the definition file on the computerized device to retrieve the application runtime requirements. Then, the virtualized computing environment will be composed by adapting an environment of the computerized device according to the application runtime requirements retrieved from the definition file.

Referring now to FIG. 1, a system 10 for composing a virtualized computing environment according to the present invention is shown. As depicted, system 10 includes computerized devices 14A-B deployed within a computer infrastructure/environment 12. This is intended to demonstrate, among other things, that some or all of the teachings of the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by a conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to compose a virtualized computing environment according to the present invention.

As shown, each computerized device 14A-B includes a processing unit 16, a memory 18, a bus 20, and input/output (I/O) interfaces 22. Further, computerized devices 14A-B are each shown in communication with external I/O devices/resources 24 and storage system 26. In general, processing unit 16 executes computer program code, such as application 30, definition system 32, and virtualization system 38, which are stored in memory 18 and/or storage system 26. While executing computer program code, processing unit 16 can read and/or write data to/from memory 18, storage system 26, and/or I/O interfaces 22. Bus 20 provides a communication link between each of the components in computerized devices 14A-B. External devices 24 can comprise any devices (e.g., keyboard, pointing device, display, etc.) that enable a user to interact with computerized devices 14A-B and/or any devices (e.g., network card, modem, etc.) that enable computerized devices 14A-B to communicate with one or more other devices.

Computer infrastructure 12 is only illustrative of various types of computer infrastructures for implementing the invention. For example, in one embodiment, computer infrastructure 12 comprises two or more devices (e.g., a server cluster) that communicate over a network to perform the various process of the invention. Moreover, computerized devices 14A-B are only representative of various possible computer systems that can include numerous combinations of hardware. To this extent, in other embodiments, computerized devices 14A-B can comprise any specific purpose article of manufacture comprising hardware and/or computer program code for performing specific functions, any article of manufacture that comprises a combination of specific purpose and general purpose hardware/software, or the like. In each case, the program code and hardware can be created using standard programming and engineering techniques, respectively. Moreover, processing unit 16 may comprise a single processing unit, or be distributed across one or more processing units in one or more locations, e.g., on a client and server. Similarly, memory 18 and/or storage system 26 can comprise any combination of various types of data storage and/or transmission media that reside at one or more physical locations. Further, I/O interfaces 22 can comprise any system for exchanging information with one or more external devices 24. Still further, it is understood that one or more additional components (e.g., system software, math co-processing unit, etc.) not shown in FIG. 1 can be included in computerized devices 14A-B. However, if computerized devices 14A-B comprise a handheld device or the like, it is understood that one or more external devices 24 (e.g., a display) and/or storage system 26 could be contained within computerized devices 14A-B, not externally as shown.

Storage system 26 can be any type of system (e.g., a database) capable of providing storage for information under the present invention. To this extent, storage system 26 could include one or more storage devices, such as a magnetic disk drive or an optical disk drive. In another embodiment, storage system 26 includes data distributed across, for example, a local area network (LAN), wide area network (WAN) or a storage area network (SAN) (not shown).

It should be understood that although FIG. 1 depicts multiple computerized devices 14A-B, this need not be the case. That is, the teachings recited herein could be carried out for a single computerized device. In addition, it should be understood that computerized devices 14A-B need not exist within the same computer infrastructure/environment 12.

Shown in memory 18 of computerized device 14A is application 30 and definition system 32. Definition system 32 includes file creation system 34 and file association system 36. Shown in memory of computerized device 14B is application 30 and virtualization system 38. Virtualization system 38 includes provisioning system 40 and environment system 42. It should be appreciated that the same functionality could be implemented with a different configuration of systems and/or sub-systems than is shown in FIG. 1. This depiction is intended to be illustrative only.

In any event, the present invention allows an environment of application 30 to be virtualized so that is can be made portable and useable on any computerized device. For example, assume that a user is operating application 30 (e.g., Lotus Notes) on computerized device 14A. In so doing, further assume that the user generates data and establishes a certain environment for using the data on computerized device 14A. The present invention will allow the environment to be just as portable as the data, so that should the user later attempt to use the data on computerized device 14B, the environment established on computerized device 14A for the data will be realized on computerized device 14B.

Specifically, further assume that the user wishes to save the data to a portable memory device 44 (e.g., using the "save as" feature provided by application 30). When the save command is issued, file creation system 34 can be activated to create a definition file that contains the details of the current environment of application 30 and/or computing device 14A in which the data was being used. (e.g., referred to herein as "application runtime requirements"). Examples of application runtime requirements can include the identity of application 30, a version of application 30, preferences set by the user (e.g., font type/size, colors, etc.), etc. To this extent, application runtime requirements can be anything that helps describe the environment in which the data was used. Once the definition file has been created, it will be saved to the portable memory device 44 and associated with the data by file association system 36, thereby virtualizing and making portable the environment. In addition, by specifically associating the definition file with its corresponding data, multiple sets of data and environments can be saved to portable memory device 44 and be simultaneously virtualized.

When portable memory device 44 is later used with computerized device 14B, an "auto-insert" script can run, which will cause provisioning system 40 to interpret the definition file on portable memory device 44 to retrieve the application runtime requirements (e.g., the details of the environment in which the data was previously used). Upon retrieval, environment system 42 will compose the virtualized computing environment by adapting the current environment of computerized device 14B and application 30 according to the application runtime requirements. Specifically, environment system 42 will adapt the environment of computerized device 14B to resemble the environment of computerized device 14A as the data was being previously used. Adapting the environment can include any action such as changing fonts, colors, etc. It can also include obtaining an update for application 30 or other pieces of software. Additionally or alternatively, it can include sending/displaying a message that certain pieces of software and/or hardware are needed to re-create the environment of computing device 14A.

It should be appreciated that definition system 32 and virtualization system 38 could be realized in any manner known. For example they could be realized as plug-ins to application 30, or be incorporated within application 30. It should also be understood that multiple computing devices 14-B are not needed to carry out the invention. For example, each computing device 14A-B could be provided with definition system 32 and/or virtualization system 38 could also be provided on computing device 14A. If the user initially used computing device 14A to manipulate the data, and then later returned to the same computing device 14A to further manipulate the data, the virtualization system 38 on computing device 14A would ensure that the initial environment was re-created. Along these lines, as an additional feature, the user could be prompted for approval before the environment is re-created (e.g., before adapting the current environment and/or interpreting the definition file). In addition, once data is stored or accessed from a portable memory device 44, it could be deleted from computing device 14A and/or 14B so that a subsequent user will not access the data.

Figure 2:
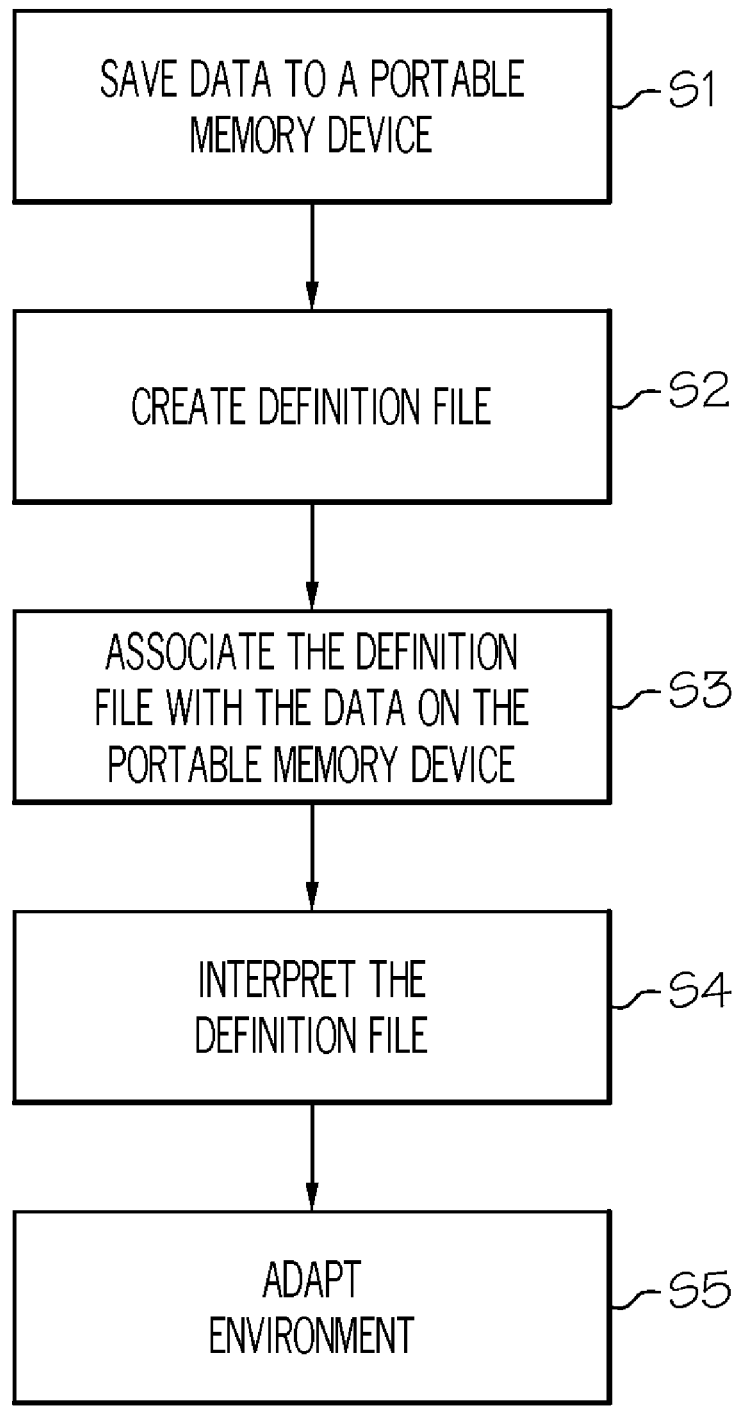
FIG. 2 depicts a method flow diagram for composing a virtualized computing environment according to the present invention.

Referring now to FIG. 2, a method flow diagram of the present invention is shown. As depicted, in step S1, data is saved to a portable memory device. In step S2, a definition file that contains application runtime requirements of the data is created. In step S3, the definition file is associated with the data on the portable memory device. In step S4, the definition file is interpreted and the application runtime requirements are retrieved. In step S5, the environment of the current computing device is adapted according to the retrieved application runtime requirements.

While shown and described herein as a method and system for composing a virtualized computing environment, it is understood that the invention further provides various alternative embodiments. For example, in one embodiment, the invention provides a computer-readable/useable medium that includes computer program code to enable a computer infrastructure to compose a virtualized computing environment. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a providing device, such as memory 18 (FIG. 1) and/or storage system 26 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to remotely compose a virtualized computing environment. In this case, the service provider can create, maintain, deploy, support, etc., a computer infrastructure, such as computer infrastructure 12 (FIG. 1) that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for composing a virtualized computing environment. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of (1) installing program code on a providing device, such as computerized devices 14A-B (FIG. 1), from a computer-readable medium; (2) adding one or more devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a providing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for composing a virtualized computing environment, comprising:
   receiving a portable memory device on a computerized device, the portable memory device containing data and a definition file that describes application runtime requirements of the data, wherein the application runtime requirements include an identity of a software application that generated the data and preferences for using the data with the software application;
   interpreting the definition file on the computerized device to retrieve the application runtime requirements;
   determining whether an environment of the computerized device includes the software application; and
   if the software application the environment of the computerized device does not include the software application, at least one of obtaining the software application and generating a message that the software application is needed, wherein at least one of the interpreting and determining is conducted by a processing unit of the computerized device; wherein the application runtime requirements include a version of the software application, and the method includes obtaining an update for the software application if the environment of the computerized device does not include the version of the software application.

2. The method of claim 1, further comprising:
   storing data on the portable memory device;
   creating the definition file and storing the definition file on the portable memory device; and
   associating the definition file with the data on the portable memory device.

3. The method of claim 2, the creating occurring in response to the storing.

4. The method of claim 1, wherein the portable memory device is selected from a group consisting of a diskette, a CD-ROM, a DVD, and a memory key.

5. The method of claim 1, the definition file describing the application runtime requirements of the data for another computerized device on which the data was previously utilized.

6. A system for composing a virtualized computing environment, comprising:
   a processing unit;
   a first system which, if executed by the processing unit, interprets a definition file stored on a portable memory device to retrieve application runtime requirements of data associated with the definition file on the portable memory device, wherein the application runtime requirements are to include an identity of a software application that generated the data and preferences for using the data with the software application; and
   a second system which, if executed by the processing unit, determines whether an environment of a computerized device includes the software application and, if the environment of the computerized device does not include the software application, at least one of obtains the software application and generates a message that the software application is needed; wherein the application runtime requirements are to include comprise at least one of the following: a software application, a version of the software application, and the second system is to obtain an update for the software application if the environment of the computerized device does not include the version of the software application.

7. The system of claim 6, further comprising:
   a system for storing data on the portable memory device;
   a system for creating the definition file; and
   a system for associating the definition file with the data on the portable memory device.

8. The system of claim 6, wherein the portable memory device is selected from a group consisting of a diskette, a CD-ROM, a DVD, and a memory key.

9. The system of claim 6, wherein the definition file describes the application runtime requirements of the data for another computerized device on which the data was previously utilized.

10. A program product stored on a computer readable storage medium for composing a virtualized computing environment, the computer readable storage medium comprising program code for causing a computerized device to perform the following steps:
    receiving a portable memory device on the computerized device, the portable memory device containing data and a definition file that describes application runtime requirements of the data, wherein the application runtime requirements include an identity of a software application that generated the data and preferences for using the data with the software application;
    interpreting the definition file on the computerized device to retrieve the application runtime requirements;
    determining whether an environment of the computerized device includes the software application; and
    if the software application the environment of the computerized device does not include the software application, at least one of obtaining the software application and generating a message that the software application is needed; wherein the application runtime requirements include a version of the software application, and the method includes obtaining an update for the software application if the environment of the computerized device does not include the version of the software application.

11. The program product of claim 10, further comprising program code for causing another computerized device to perform the following steps:
    storing data on the portable memory device;
    creating the definition file and storing the definition file on the portable memory device; and
    associating the definition file with the data on the portable memory device.

12. The program product of claim 11, the creating being in response to the storing.

13. The program product of claim 10, wherein the portable memory device is selected from a group consisting of a diskette, a CD-ROM, a DVD, and a memory key.

14. The program product of claim 10, wherein the definition file describes the application runtime requirements of the data for another computerized device on which the data was previously utilized.

15. A method for deploying an application for composing a virtualized computing environment, comprising:
    providing a computer infrastructure being operable to:
        receive a portable memory device on a computerized device, the portable memory device containing data and a definition file that describes application runtime requirements of the data, wherein the application runtime requirements include an identity of a software application that generated the data and preferences for using the data with the software application;
        interpret the definition file on the computerized device to retrieve the application runtime requirements;

determining whether an environment of the computerized device includes the software application; and if the software application the environment of the computerized device does not include the software application, at least one of obtaining the software application and generating a message that the software application is needed; wherein the application runtime requirements include a version of the software application, and the method includes obtaining an update for the software application if the environment of the computerized device does not include the version of the software application.

16. The method of claim 15, wherein the definition file describes the application runtime requirements of the data for another computerized device on which the data was previously utilized.

* * * * *